United States Patent
Masaki

(10) Patent No.: US 12,030,279 B2
(45) Date of Patent: Jul. 9, 2024

(54) VEHICLE GLAZING

(71) Applicant: AGC GLASS EUROPE, Louvain-la-Neuve (BE)

(72) Inventor: Yuji Masaki, Kraainem (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 854 days.

(21) Appl. No.: 15/763,362

(22) PCT Filed: Aug. 23, 2016

(86) PCT No.: PCT/EP2016/069851
§ 371 (c)(1),
(2) Date: Mar. 26, 2018

(87) PCT Pub. No.: WO2017/054989
PCT Pub. Date: Apr. 6, 2017

(65) Prior Publication Data
US 2018/0304589 A1    Oct. 25, 2018

(30) Foreign Application Priority Data

Sep. 30, 2015    (EP) .................................... 15187598

(51) Int. Cl.
*B32B 17/10*    (2006.01)
*B32B 3/30*    (2006.01)

(52) U.S. Cl.
CPC .......... *B32B 17/10587* (2013.01); *B32B 3/30* (2013.01); *B32B 17/10036* (2013.01);
(Continued)

(58) Field of Classification Search
CPC ........ B32B 17/10587; B32B 17/10229; B32B 17/10678; B32B 17/10174;
(Continued)

(56) References Cited

U.S. PATENT DOCUMENTS

| 4,452,840 A | * | 6/1984 | Sato .......................... B32B 3/30 |
| | | | 428/156 |
| 5,091,258 A | | 2/1992 | Moran |

(Continued)

FOREIGN PATENT DOCUMENTS

| DE | 19951444 A1 | 4/2001 |
| DE | 10043141 A1 | 3/2002 |

OTHER PUBLICATIONS

International Search Report dated Nov. 23, 2016, in PCT/EP2016/069851, filed Aug. 23, 2016.

*Primary Examiner* — Nancy R Johnson
(74) *Attorney, Agent, or Firm* — Oblon, McClelland, Maier & Neustadt, L.L.P.

(57) ABSTRACT

The present invention concerns a laminated glazing having variable light transmission comprising two glass sheets, an external glass sheet and an internal glass sheet, that are joined by at least one thermoplastic interlayer sheet, an assembly of a functional film, which is incorporated into the laminate between the two glass sheets. According to the invention, the at least one thermoplastic interlayer sheet has a roughness with a Rz comprised between 50 and 400 μm and a Ra comprised between 15 and 90 μm and preferably with a Rz comprised between 100 and 400 μm and a Ra comprised between 30 and 90 μm.

21 Claims, 3 Drawing Sheets

Figure 1:
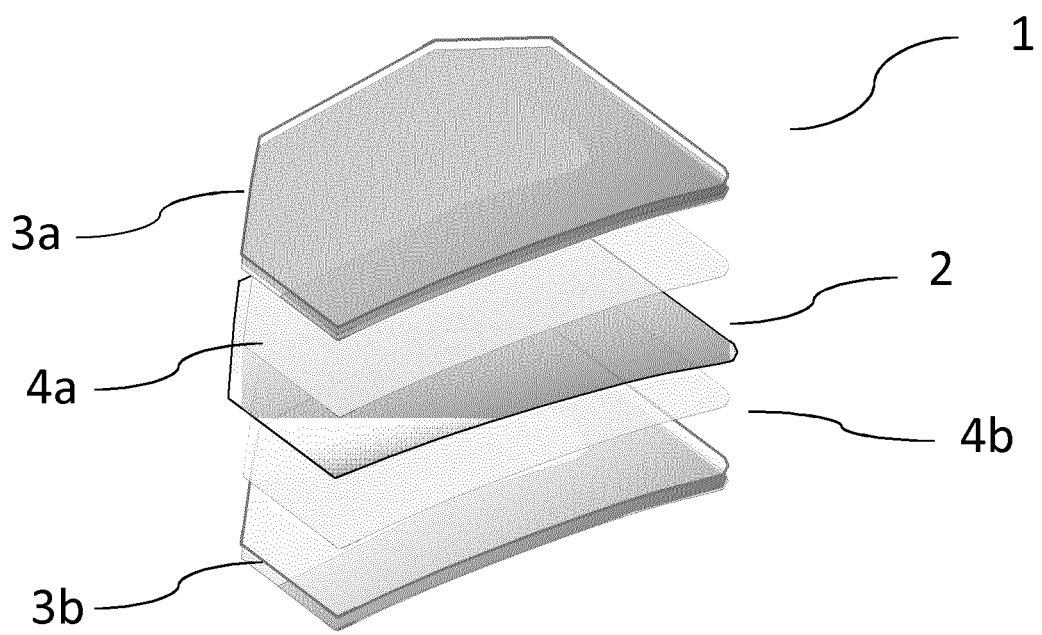

(52) U.S. Cl.
CPC .. *B32B 17/10174* (2013.01); *B32B 17/10229* (2013.01); *B32B 17/10504* (2013.01); *B32B 17/10532* (2013.01); *B32B 17/10678* (2013.01); *B32B 17/10743* (2013.01); *B32B 17/10761* (2013.01); *B32B 17/10788* (2013.01); *B32B 2605/006* (2013.01)

(58) Field of Classification Search
CPC ........ B32B 17/10036; B32B 17/10504; B32B 17/10532; B32B 17/10743; B32B 17/10761; B32B 17/10788; B32B 2605/006; B32B 3/30
See application file for complete search history.

(56) References Cited

U.S. PATENT DOCUMENTS

| | | | |
|---|---|---|---|
| 5,425,977 A | | 6/1995 | Hopfe |
| 5,455,103 A | * | 10/1995 | Hoagland ......... B32B 17/10577 428/167 |
| 2004/0191482 A1 | * | 9/2004 | Nakajima ............. B29C 59/022 428/156 |
| 2008/0268204 A1 | | 10/2008 | Bourcier et al. |
| 2009/0176101 A1 | * | 7/2009 | Greenall ............. B32B 17/1077 428/412 |
| 2009/0286046 A1 | | 11/2009 | Bourcier et al. |

\* cited by examiner (a)

(b)

VEHICLE GLAZING

The present invention relates to a method of manufacturing a laminated glazing, in particular, a method of manufacturing a glazing containing a functional film.

In recent years, glazings having some form of additional functionality have become increasingly popular and sought-after. Typically, additional functionality is provided by using at least one sheet of coated or tinted glass within a laminated glazing structure, to provide heat or UV-reflective properties. However, additional functionality can also be provided by including a functional device or film within a laminated glazing structure. Such devices or films may include lighting devices, such as LEDs (light emitting diodes), or switchable films, such as, LCDs (liquid crystal displays), or SPDs (suspended particle devices).

An SPD, is a film comprising a plurality of particles suspended within a liquid suspension medium, which are held within a polymer medium. The film is switchable between a dark state (when no is voltage applied), and a highly transparent state (when voltage is applied). The degree of relative alignment between the particles is determined by the applied AC voltage, such that an SPD-based device exhibits a variable optical transmission when a variable voltage is applied.

DE 100 43 141 discloses a glazing for use as a rooflight, which incorporates an SPD layer. Two sheets of glass are formed into a double glazing structure having a partial vacuum in the gap between the plies, with an SPD layer deposited on the inner side of the lower glass ply. The SPD is switchable between a dark state and a light state.

It is preferable to be able to include a functional device, such as an SPD film, LCD film, LEDs and any suitable film, within a laminated glazing structure, as the whole, or part of, the interlayer, as described in, for example, US2004/0257649, rather than using a partially evacuated double glazing structure. The interlayer used in typical laminated glazing constructions is a PVB (poly vinyl butyral) interlayer.

As part of the laminating process, the functional film, interlayers and sheet of glass may be autoclaved, and subjected to pressure at elevated temperature. However, when classical interlayers such as PVB or EVA interlayers are used, the lamination temperature can cause a permanent degradation in the optical performance of the functional film due of the presence of bubbles. Thus, the lamination process is not optimized. In addition, in the final laminate, defects may be present, such defects are for example bubbles.

Clearly, the presence of bubbles within the laminating glazing is unacceptable from a quality control point of view, as it affects the visual appearance of the glazing and may also damage the functionality of the film. There is therefore a need for a manufacturing method which enables a functional film such as a SPD film, PDLC film, LEDs film, to be included within a laminated glazing, which minimizes or prevents formation of bubbles or some others defects such as wrinkle of the functional film, delamination between the functional film and glass or interlayer occurring at any point during the manufacture of the glazing.

The present invention aims to address these problems by providing a laminated glazing comprising two glass sheets, an external glass sheet and an internal glass sheet, that are joined by at least one thermoplastic interlayer sheet, an assembly of a functional film, which is incorporated into the laminate between the two glass sheets.

According to the invention, the at least one thermoplastic interlayer sheet has a roughness with a Rz comprised between 50 and 400 µm and a Ra comprised between 15 and 90 µm and preferably with a Rz comprised between 100 and 400 µm and a Ra comprised between 30 and 90 µm.

The Average Roughness (Ra) is calculated by an algorithm that measures the average length between the peaks and valleys and the deviation from the mean line on the entire surface within the sampling length. Ra averages all peaks and valleys of the roughness profile and then neutralizes the few outlying points so that the extreme points have no significant impact on the final results.

The mean roughness depth (Rz) is calculated by measuring the vertical distance from the highest peak to the lowest valley within five sampling lengths, then averaging these distances. Rz averages only the five highest peaks and the five deepest valleys—therefore extremes have a much greater influence on the final value.

The interlayer material according to the invention is chosen to minimize the formation of bubbles or defects within the laminated glazing. It has been appreciated that the formation of bubbles between the "different layers" of the laminated glazing is partially due of the interlayer material.

By providing a structure wherein the thermoplastic interlayer sheet has a roughness with a Rz comprised between 50 and 400 µm and a Ra comprised between 15 and 90 µm and preferably with a Rz comprised between 100 and 400 µm and a Ra comprised between 30 and 90 µm, is in contact with the internal faces of respectively the first and second glass, the observed damage can be reduced or even eliminated.

Preferably, the laminated glazing according to the invention is a glazing for automotive vehicle.

According to one preferred embodiment of the invention, the laminated glazing is a glazing for a roof of an automotive vehicle. Then, the functional film is laminated between at least a first and a second glass sheets thanks to at least a thermoplastic interlayer sheet having a roughness with a Rz comprised between 50 and 400 µm and a Ra comprised between 15 and 90 and preferably with a Rz comprised between 100 and 400 µm and a Ra comprised between 30 and 90 µm. In this case, the face of the thermoplastic interlayer according to the invention is preferably in contact with the glass sheet.

According to one embodiment of the present invention, the functional film is laminated directly between two (a first and a second) thermoplastic interlayer sheets having a roughness with a Rz comprised between 50 and 400 µm and a Ra comprised between 15 and 90 and preferably with a Rz comprised between 100 and 400 µm and a Ra comprised between 30 and 90 µm, the rough face of the first thermoplastic interlayer sheet is then preferably in contact with the internal face (commonly called face 2) of the external glass and the rough face of the second thermoplastic interlayer sheet is in contact with the internal face (commonly called face 3) of the external glass When the laminated glazing according to the present invention is a laminated glazing for automotive vehicle, the functional film is laminated between a first glass sheet facing out of the vehicle (called external glass) and a second glass sheet facing into the vehicle (internal glass).

According to one embodiment of the present invention, the at least one thermoplastic interlayer sheet comprises at least one face provided with a pattern formed in the bulk (mass) of the thermoplastic interlayer sheet by a plurality of embossed geometrical patterns, concave and/or convex relative to the general plane of said face, straight (rectilinear) and parallel extending along said face. Accordingly, in a preferred embodiment of the present invention, the geometrical patterns are triangular prisms or diamond or pyramid shape. The advantages of this kind of shape are to have better de-airing between glass and interlayer in order to avoid bubble formation, which results in reducing de-airing cycle (time).

According to one embodiment of the present invention, the at least one thermoplastic interlayer sheet placed between the functional film and the glass has its two faces (first and second faces) provided with a pattern, the first face is provided with a pattern having a roughness different from the pattern and so the roughness of the second face. The roughness facing the glass is higher than the roughness facing to the functional film.

According to a preferred embodiment of the present invention, the thermoplastic interlayer sheet comprises at least one face provided with a pattern formed in the bulk (mass) of the thermoplastic interlayer sheet by a plurality of embossed geometrical patterns, concave and/or convex relative to the general plane of said face, straight (rectilinear) and parallel extending along said face and wherein for each individual pattern, the angle $\alpha$ at the top is between 0 and 90°

According to a preferred embodiment, the geometrical patterns are substantially contiguous and extend along all the surface of the thermoplastic interlayer sheet.

Then preferably, the rough faces of the said thermoplastic interlayer sheets are respectively in contact with the first and second glass sheets and the "smooth faces" of the two thermoplastic interlayer sheets are in contact with the functional film. Thus, according to the present invention, the functional film is better laminated between the 2 glass sheets avoiding, preventing, the formation of bubbles within the laminated glazing according to the invention and thus prevent damaging of the functional film.

According to one preferred embodiment of the present invention, at least one thermoplastic interlayer sheet having a roughness with a Rz comprised between 50 and 400 µm and a Ra comprised between 15 and 90 µm, and preferably with a Rz comprised between 100 and 400 µm and a Ra comprised between 30 and 90 µm is provided on both sides of the functional film. Thus the de-airing process is improved via lower risk of having bubbles.

According to one preferred embodiment of the present invention, the at least one face of the thermoplastic interlayer sheet provided with a texturing formed in the bulk (mass) is in contact with the glass sheet. Indeed, when the textured face of the thermoplastic interlayer is in contact with the glass sheet and not in contact with the functional film, the inventors have shown that the presence of the bubbles within the laminated glazing, after the lamination process, is minimized or suppressed. Furthermore, optical defects of the laminated glazing are decreased.

According to one embodiment of the present invention, the interlayer thermoplastic sheet has a thickness comprised between 0.2 to 0.7 mm and preferably between 0.2 to 0.5 mm.

According to one embodiment of the present invention, the functional film is laminated between at least a first and second sheets of thermoplastic interlayer and the functional film is surrounded by a further frame of a sheet of thermoplastic interlayer. The first and the second thermoplastic interlayer according to the invention present on at least one face a roughness with a Rz comprised between 50 and 400 µm and a Ra comprised between 15 and 90 µm, and preferably with a Rz comprised between 100 and 400 µm and a Ra comprised between 30 and 90 µm, are each in contact with and co-extensive with one of the first and second sheet of glass through the faces having a roughness with a Rz comprised between 50 and 400 µm and a Ra comprised between 15 and 90 µm, and preferably with a Rz comprised between 100 and 400 µm and a Ra comprised between 30 and 90 µm, the functional film being in contact smooth faces" of the two thermoplastic interlayer sheets.

In a preferred embodiment of the present invention, at least one of the at least one thermoplastic interlayer sheet is one of ethylene vinyl acetate copolymer, polyurethane, polycarbonate, poly vinyl chloride or a copolymer of ethylene and methacrylic acid.

Preferably, the first and the second and also a frame surrounded the functional film are one of ethylene vinyl acetate copolymer, polyurethane, polycarbonate, poly vinyl chloride or a copolymer of ethylene and methacrylic acid.

More preferably, the first and the second and also the frame surrounded the functional film are of ethylene vinyl acetate copolymer.

Indeed, the use of ethylene vinyl acetate copolymer as thermoplastic interlayer sheet allow to decrease the temperature used during the lamination process and allow to prevent the degradation of the functional film. In parallel there is no need of high pressure (autoclave) thanks to utilization of this kind of interlayer. High pressure can cause ageing problem of SPD film (e.g TL decreasing). In addition the EVA type of interlayer has lower humidity content and no content of plasticizers (thus no edge clearing defect-loosing of the material emulsion around the perimeter). The advantage of use of EVA are to avoid degradation of the functional film thanks to no plasticizer containing EVA and also lower temperature lamination is possible in comparison with PVB or other thermoplastic interlayer. Preferably, according to the invention the at least one sheet of thermoplastic interlayer protects the functional film against UV.

Preferably, the laminated glazing further comprises a fourth sheet of interlayer material and a barrier layer, the barrier layer being between the first and third sheets of interlayer material, or the third and fourth sheets of interlayer material. Preferably, the barrier layer is poly ethylene terephthalate. The fourth sheet of interlayer material may be coloured and/or has acoustic properties.

The laminated glazing may comprising at least one of a solar control, heat reflective, low-emissivity, hydrophobic or hydrophilic coating.

According to the invention, the functional film is preferably a film having variable color and/or light transmission.

According to one preferred embodiment of the present invention, the functional film is a SPD film, a polymer dispersed liquid crystals (PDLC) film, a poly ethylene terephthalate substrate having a heat reflective solar control coating.

In another embodiment of the present invention, the laminated glazing comprises a system of layers selectively reflecting the infrared, said system being placed between the external glass and the functional film.

In another embodiment of the present invention, a fifth sheet of an interlayer material, interposed between the fourth sheet of interlayer material and the second ply of glass. At least one sheet of interlayer material may have solar control properties.

Preferably, according to the invention the at least one sheet of thermoplastic interlayer protects the functional film against UV (also called UV-cut interlayer). Thus, the functional film is protected from UV deteriorations (UV aging . . . ) since functional film according to the invention have tended to degrade over time due to exposure to ultraviolet ("UV") light, high temperatures, and chemical reactions.

Alternatively, the laminated glazing may comprise a third sheet of glass

Figure 2:
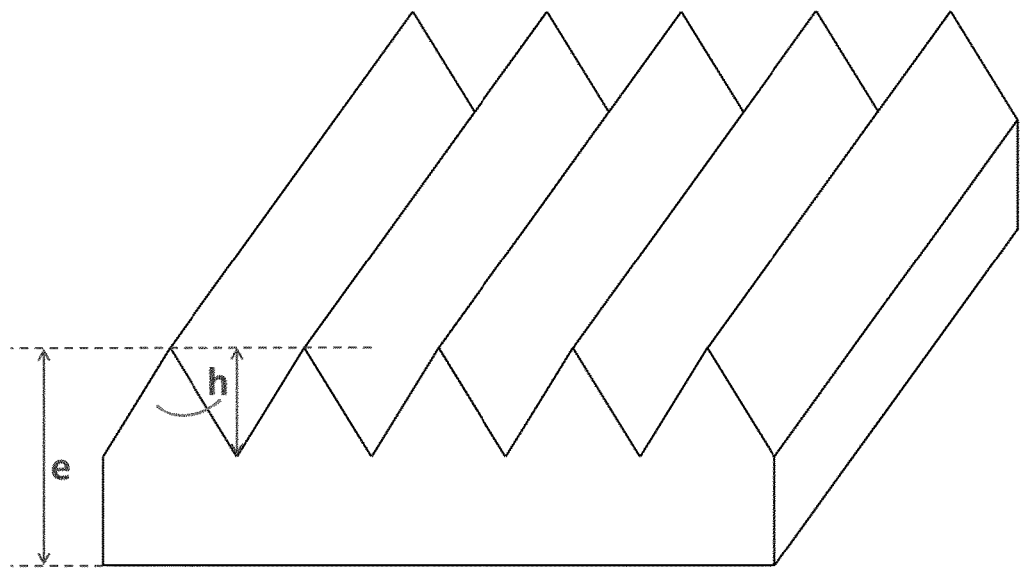
Figure 2:
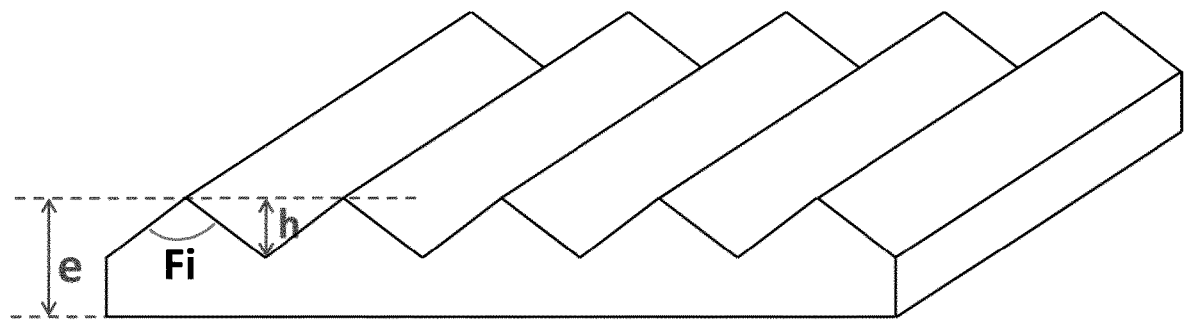
Figure 3:
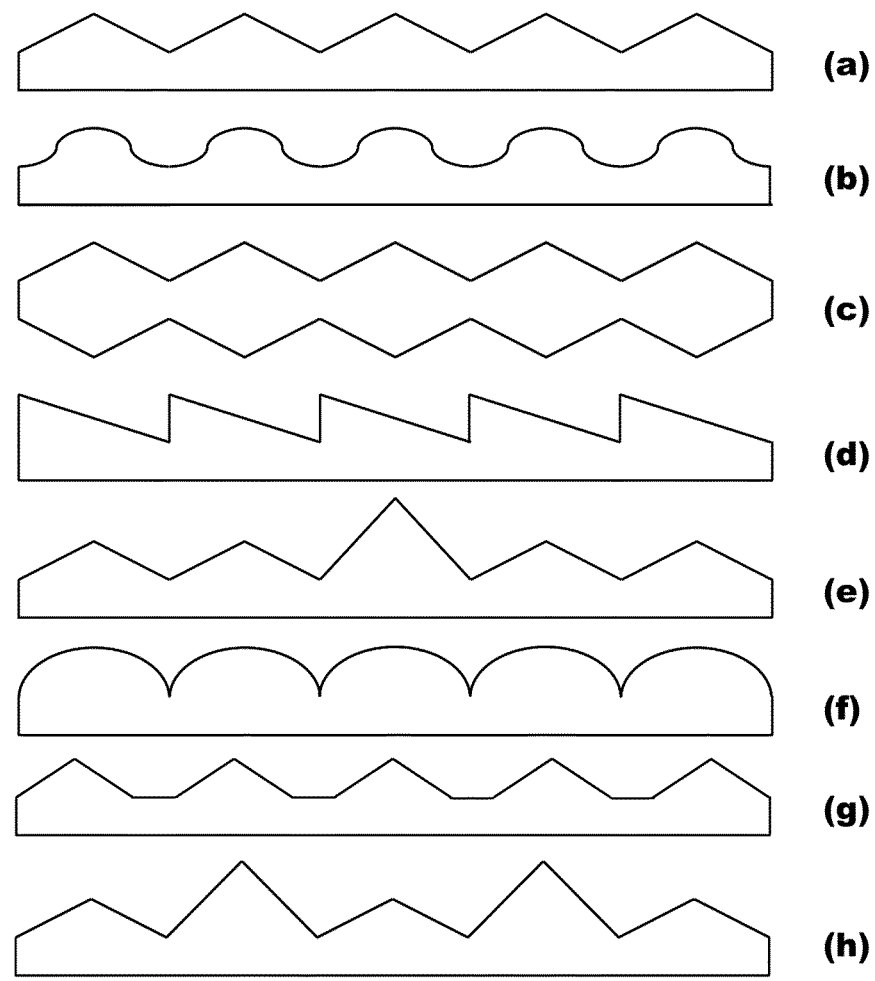

The present invention will now be described by way of example only, and with reference to the accompanying drawings in which:

FIG. 1, as referred to above, is a schematic plan view of a laminated glazing having an SPD film laminated therein;

FIG. 2 is a schematic view of some examples of a thermoplastic layer sheet according to the invention, FIG. 3 represents a sectional view of some examples of kind of embossed patterns of the at least thermoplastic layer according to the invention;

It has been appreciated that there is at least the property of the interlayer that influences the presence of bubbles in a laminated glazing. By determining this mechanism, it has been possible to develop a laminated glazing wherein the presence of bubbles is minimized or eliminated.

In the present description, when a range is mentioned, the ends are included. In addition, all integer values and subfields in the numerical ranges are expressly included as if explicitly written.

By one face of a thermoplastic interlayer sheet is understood one of the two faces/main surfaces of the sheet.

The thickness e of the interlayer having a textured surface comprising a plurality of embossed geometrical patterns is defined according to the invention as including the height h of the patterns as shown in FIGS. 2(a) and 2(b) (in perspective view).

According to the invention, the general plane of a textured face is the plane containing the points of this face that do not belong to the patterns and/or, in the case of contiguous patterns, the junction points between the patterns.

According to the invention, the embossed patterns may be concave and/or convex. A linear embossed pattern and convex with respect to the general plane of a face of the thermoplastic interlayer sheet is projecting regarding to this plane and then we can speak of "ribs". According to the invention, a linear embossed pattern and concave with respect to the general plane of a face of thermoplastic interlayer sheet is hollow in the mass of the interlayer sheet, below the said general plane and then one can speaks of "grooves".

According to the invention, the plurality of embossed geometrical patterns, concave and/or convex relative to the general plane of said face are rectilinear and parallel extending along said face. By rectilinear pattern, it is understood a pattern in the form of a straight line.

According to the invention, in the case of a square or rectangular thermoplastic interlayer sheet, the main axis of the straight and parallel patterns may form an angle of 90° with the two edges of the sheet and 0° with the two other. Alternatively, the angles between the principal axis of rectilinear and parallel patterns and two edges of the sheet may take any values between 0 and 90°. The angle between the main axis and the other two edges of the sheet is then the complementary angle of the preceding.

Preferably, the individual patterns are as close as possible to each other. They are for example spaced less than 2 mm and preferably less than 1 mm. More preferably, the patterns are contiguous. This is advantageous because the texturing density is then maximized in favor of the transmission. By contiguous features, it is understood patterns that touch at at least a part of their surface, for example via an edge part of the general plane of the sheet in case of straight and parallel pattern.

According to one embodiment of the invention, the textured face of the thermoplastic interlayer sheet is provided with texturing only a portion of its surface. Alternatively and preferably, the textured surface of the thermoplastic interlayer sheet is provided with texturing over a majority of its surface. By a majority of the surface of the textured face is meant at least 80% of the surface, or even at least 90% of the surface. This is also advantageous in terms of texturizing density.

According to the invention, the patterns may be different or identical in terms of geometry and/or in terms of size. In cases of several types of patterns (size/geometry) co-existing, for determining the thickness of the thermoplastic interlayer sheet, patterns covering the majority of the surface of the sheet are considered.

FIG. 3(a) to (h) schematically shows, in cross-sectional view of the thermoplastic interlayer sheet, various configurations/geometries for the patterns according to the invention, as examples.

According to a preferred embodiment of the invention, the geometric patterns are prisms. By prism it is understood a polyhedron having two parallel polygonal surfaces whose vertices are joined 2 to 2 by edges, forming the side faces which are parallelograms. Preferably, according to this embodiment, the geometric patterns are triangular prisms. By triangular prism, it is understood a prism with two parallel polygonal surfaces which are triangles. FIGS. 2(a) and (b) and 3(a), (c), (d), (e), (g) and (h) represents a thermoplastic interlayer sheet according to the invention having a textured surface comprising a plurality of patterns, said patterns having the shape of triangular prisms.

For the case where the patterns have the shape of triangular prisms, the triangular prism may be truncated. Such truncation is to shave the upper edge of the triangular prism (meaning that is not part of the general plane of the sheet). In this case the initial faces of the triangular prism become trapezoidal.

Also for the case where the patterns have the form of triangular prisms, the apex angle a (see FIGS. 2(a) and (b)) is preferably between 60 and 120° for each individual pattern.

The texturing of the thermoplastic interlayer sheet according to the invention may be carried out by rolling, etching, thermoforming, etc. Advantageously, the texturing of the thermoplastic interlayer sheet of the invention is obtained by laminating the surface of a thermoplastic interlayer sheet, the thermoplastic interlayer being at a temperature at which it is possible to deform its surface, for example using a metal roller having on its surface patterns to create in negative.

FIG. 1 shows an example of a laminated glazing and more particularly a roof for automotive comprising an SPD film laminated therein as functional film according to the invention. The glazing 1 has an SPD film 2 laminated within a well-known SPD interlayer structure (not shown in order to not overload the FIG. 1), which is itself laminated between two sheet of glass 3a, 3b. the glass sheet 3a is the outer glass sheet and the glass sheet 3b is the inner glass sheet. The well-known SPD interlayer structure comprises a frame wherein the SPD film is placed. The SPD film 2 is laminated between a first 4a and a second 4b thermoplastic interlayer sheets according to the present invention, which are co-extensive with the sheet of glass 3a, 3b. According to this embodiment, the first 4a and the second 4b thermoplastic interlayer sheets are EVA sheets. The first and second thermoplastic interlayer sheets 4a and 4b have one face provided with embossed triangle patterns with a Rz of 100 µm and a Ra of 40 µm and a thickness of 0.4 mm. The embossed triangle patterns are present along all the surface of the thermoplastic interlayer sheet. The pitch between each pattern is comprised between 0.1 and 2 mm. The textured face of the first thermoplastic interlayer sheets 4a is in contact with the internal face of the external sheet of glass 3a and the textured face of the second thermoplastic interlayer sheets 4b is in contact with the internal face of the internal sheet of glass 3b, the "smooth" faces of the first and second thermoplastic interlayer sheets 4a and 4b being in contact with the SPD film.

The SPD films used in the samples were polymer dispersed SPD films available in the market. The laminated glazing was vacuum bagged and placed in an oven at 105[deg.]C for 40 minutes. Once the lamination cycle had been completed, both samples were then heated at elevated temperature at atmospheric pressure for various time periods, in order to determine the extent to which a border region appeared under extreme conditions. Once this heating was complete, the samples were inspected visually.

No bubbles or very sparsely bubbles were observed in samples having an EVA interlayer according to the invention.

When a glazing in accordance with the present invention is used as an automotive glazing, such as a rooflight, a sidelight or a backlight, it is desirable to be able to control the colour of the glazing. One way in which this may be done is to use at least one ply of glass which is tinted, for example, having an LT (light transmission) when measured using CIE Illuminant A of less than 87% at 2.1 mm. Preferably the plies of glass used are annealed or semi-toughened before lamination.

An alternative approach, when at least one ply of clear (having an LT of greater than 88%, measured using CIR Illuminant A) is used, is to include at least one layer of a tinted PVB in the laminated structure in which the SPD film is placed.

Alternatively, a colored PVB interlayer may be included.

For a glazing to be included in a vehicle, for example, as a rooflight, the busbars and electrical connectors between the SPD film and the wiring harness of the vehicle may be hidden by an obscuration band. This is a band of fired, black ceramic ink around the edge of the upper ply of glass, which acts to cover the adhesive holding the glazing into a vehicle, and electrical connections. The purpose of the band is two-fold, firstly aesthetic, and secondly, to prevent damage of adhesive or other components from UV exposure. The obscuration band may also hide the edges of the SPD film.

When a coloured EVA interlayer material is used in the glazing construction, or a coloured PET substrate used in the manufacture of the SPD film, a clear PVB interlayer material having acoustic properties may be used. Alternatively, a coloured acoustic PVB interlayer material may be used.

It may be desirable, as an alternative to using a coated glass to provide solar control, to use an interlayer material which provides a degree of solar control. For example, additives such as pigments or nanoparticle systems including LaB6 or ITO (indium tin oxide), are known for use with PVB interlayers, and may be used in an EVA interlayer in the laminated glazing structure of the present invention.

However, rather than using a solar control interlayer or providing a coating on one of the plies of glass, it may be desirable to include a solar reflective, in particular, a double-layered silver coating, on a PET substrate included within an interlayer structure in a laminated glazing.

Suitable functional coatings for use with such a glazing construction when used as a rooflight include low-emissivity coatings, conductive coatings and solar control coatings. A low emissivity coating is a coating which when applied to clear, 3 mm thick float glass, results in the coated glass having an emissivity in the range of 0.05 to 0.45, the actual value being measured in accordance with EN 12898 (a published standard of the European Association of Flat Glass Manufacturers). Hard coatings generally have emissivities between 0.15 and 0.2, whereas off-line coatings generally have emissivities of 0.05 to 0.1. As a comparison, uncoated 3 mm thick float glass has an emissivity of 0.89.

A hard (or pyro lytic) low emissivity coating may comprise a single layer of a metal oxide, preferably a transparent, electrically conductive oxide. Oxides of metals such as tin, zinc, indium, tungsten and molybdenum may be present in the metal oxide layer. Typically, the coating comprises a further dopant, such as fluorine, chlorine, antimony, tin, aluminium, tantalum, niobium, indium or gallium, for example, fluorine-doped tin oxide or tin-doped indium oxide may be used. Such coatings are generally provided with an underlayer, such as silicon or silicon oxynitride. The underlayer acts as a barrier to control migration of alkali metal ions from the glass and/or to suppress iridescent reflection colours caused by variations in thickness of the low emissivity layer.

Off-line (typically sputtered) low emissivity coatings typically comprise a multilayer coating stack, normally including at least one metal layer or electrically conductive metal compound layer, and a dielectric layer. Silver, gold, copper, nickel or chromium may be used as the metal layer, whereas indium oxide, antimony oxide or the like may be used as the electrically conductive compound. Typical multilayer stacks comprise one or two layers of silver deposited between layers of a dielectric such as an oxide of silicon, aluminum, titanium, vanadium, tin, or zinc. Individual layers of such coatings are typically tens of nanometers in thickness. Low emissivity coatings may be provided on either surface of the upper and lower plies of glass in the laminated glazing structure, depending on the combination of interlayers used and desired thermal performance.

Typical solar control coatings comprise layers of silver or tin oxide, and control the amount of heat absorbed through the coated glass. Solar control and low emissivity coatings may also be electrically conductive, and so not only provide functionality to the glass in terms of emissivity and heat transmission, but can form an electrically conductive substrate for mounting electrically conductive devices such as LEDs, sensors and cameras.

A heat reflective solar control coating, for example, a two-layer silver coating, may also be used. Typically, the solar heat reflected by such coatings is greater than 23%, measured in accordance with ISO9050:E(2003), air mass 1.5. Metallic heat reflective coatings may also be electrically conductive, and are particularly useful if the outer ply of glass is of clear glass. Such coatings are typically provided on the inner side of an outer ply of clear glass.

The present invention therefore provides a glazing which is switchable to alter the amount of light entering a vehicle through the glazing.

Further embodiments of the invention, within the scope of the appended claims, will be apparent to those skilled in the art.

The invention claimed is:

1. A laminated glazing having variable light transmission comprising:
   two glass sheets, an external glass sheet and an internal glass sheet;
   at least one thermoplastic interlayer sheet that joins the two glass sheets; and a functional film assembly comprising a functional film, which is incorporated into the laminate between the two glass sheets, wherein the at least one thermoplastic interlayer sheet has a roughness, prior to lamination, on one surface of the thermoplastic interlayer sheet with a Rz of between 100 and 400 µm and a Ra of between 15 and 90 µm, and wherein the surface of the at least one thermoplastic interlayer sheet prior to lamination comprises a pattern formed in a bulk of the at least thermoplastic interlayer sheet where the pattern comprises a plurality of untruncated triangular prisms or curved concave or convex shapes relative to a general plane of said surface.

2. The laminated glazing according to claim 1, wherein the theiinoplastic interlayer sheet has a roughness with a Rz of between 100 and 400 µm and a Ra of between 30 and 90 µm.

3. The laminated glazing according to claim 1, which is suitable for an automotive use.

4. The laminated glazing according to claim 1, which is suitable for use as an automotive roof.

5. The laminated glazing according to claim 1, further comprising a second thermoplastic interlayer sheet having a rough face,
wherein the thermoplastic interlayer sheet is in contact with the external glass sheet and the second thermoplastic interlayer sheet is in contact with the internal glass sheet and
wherein the rough faces of the thermoplastic interlayer sheets are respectively in contact with the external and internal glass sheets and faces of the two thermoplastic interlayer sheets opposite the rough faces are in contact with the functional film.

6. The laminated glazing according to claim 1, wherein the thermoplastic interlayer sheet is provided in contact with the external or the internal glass sheet and the thermoplastic interlayer has both first and second faces provided with a pattern, the pattern on the first face has the roughness on the surface of the thermoplastic interlayer sheet, the second face has a pattern and a roughness different from the pattern and the roughness of the first face, and the first face roughness facing the external or internal glass sheet having a higher Rz and Ra than the second face Rz and Ra facing to the functional film.

7. The laminated glazing according to claim 1, wherein the pattern comprises triangular prisms.

8. The laminated glazing according to claim 1, wherein the pattern is substantially contiguous and extends along all the surface of the thermoplastic interlayer sheet.

9. The laminated glazing according to claim 1, wherein the interlayer thermoplastic sheet has a thickness of 0.2 to 0.7 mm.

10. The laminated glazing according to claim 1, wherein for each individual pattern, the angle a at the top is between 0 and 90°.

11. The laminated glazing according to claim 1, wherein the thermoplastic interlayer is an ethylene-vinylacetate copolymer or an ethylene-(meth)acrylic ester copolymer or polyvinyl butyral.

12. The laminated glazing according to claim 11, wherein the thermoplastic interlayer is a polyvinyl butyral.

13. The laminated glazing according to claim 1, comprising at least two of the thermoplastic interlayer sheet, wherein a first thermoplastic interlayer sheet is provided on a first side of the functional film, and a second thermoplastic interlayer sheet is provided on a second side of the functional film.

14. The laminated glazing according to claim 1, wherein the face of the thermoplastic interlayer sheet provided with a pattern formed in the bulk is in contact with the glass sheet.

15. The laminated glazing according to claim 1, wherein the thermoplastic interlayer sheet is an UV-cut interlayer.

16. The laminated glazing according to claim 1, wherein the functional film is a film having variable color and/or light transmission.

17. The laminated glazing according to claim 16, wherein the functional film is a SPD (Suspended Particle Device) film or PDLC (Polymer Dispersed Liquid Crystals) film.

18. The laminated glazing according to claim 1, further comprising a system of layers selectively reflecting infrared, said system being disposed between the external glass and the functional film.

19. A laminated glazing having variable light transmission comprising:
two glass sheets, an external glass sheet and an internal glass sheet;
first and second thermoplastic interlayer sheets between the two glass sheets; and
a functional film assembly comprising a functional film, which is incorporated into the laminate between the two glass sheets and between the first and second thermoplastic interlayer sheets,
wherein the first and second thermoplastic interlayer sheets each have a roughness before lamination on one surface of the thermoplastic interlayer sheet with a Rz of between 100 and 400 µm and a Ra of between 30 and 90 µm and the first and second thermoplastic sheets each have a smooth surface that does not have the roughness, and
wherein each smooth surface is in contact with the functional film.

20. The laminated glazing according to claim 19, where the functional film assembly comprises an SPD (Suspended Particle Device) film or PDLC (Polymer Dispersed Liquid Crystals) film, which is incorporated into the laminate between and in contact with the smooth surface of the first and second thermoplastic interlayer sheets, and
wherein the thermoplastic interlayer sheets comprise ethylene-vinylacetate copolymer.

21. The laminated glazing according to claim 19, wherein the surface of each thermoplastic interlayer sheet prior to lamination comprises a pattern formed in a bulk of the at least thermoplastic interlayer sheet where the pattern comprises a plurality of geometric prisms or curved concave or convex shapes relative to the general plane of said surface.

* * * * *